United States Patent
Kuroshita et al.

(10) Patent No.: US 10,569,783 B2
(45) Date of Patent: Feb. 25, 2020

(54) WORK VEHICLE WITH SPEED CONTROL SYSTEM

(71) Applicant: KUBOTA CORPORATION, Osaka (JP)

(72) Inventors: Yoshihiko Kuroshita, Osaka (JP); Susumu Umemoto, Osaka (JP); Yoshitomo Fujimoto, Osaka (JP); Takashi Kobayashi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 308 days.

(21) Appl. No.: 15/618,829

(22) Filed: Jun. 9, 2017

(65) Prior Publication Data

US 2017/0355372 A1 Dec. 14, 2017

(30) Foreign Application Priority Data

Jun. 13, 2016 (JP) .................................. 2016-117194

(51) Int. Cl.
*B60W 30/188* (2012.01)

(52) U.S. Cl.
CPC ....... *B60W 30/188* (2013.01); *B60W 2510/18* (2013.01); *B60W 2540/10* (2013.01); *B60W 2720/10* (2013.01)

(58) Field of Classification Search
None
See application file for complete search history.

(56) References Cited

U.S. PATENT DOCUMENTS

2016/0046278 A1* 2/2016 Matsuzaki .............. B60L 58/13
701/22
2019/0161081 A1* 5/2019 Ogura ................. B60W 30/143

FOREIGN PATENT DOCUMENTS

JP 4609390 B2 * 1/2011 ............ B60K 28/08
JP 2012-244961 12/2012

* cited by examiner

*Primary Examiner* — Abdhesh K Jha
(74) *Attorney, Agent, or Firm* — Greenblum and Bernstein, P.L.C.

(57) ABSTRACT

Work vehicle having a coupling member which is switchable between a coupled state where left/right brake operation tools are integrally coupled and a released state releasing the coupling. A coupled state detector is utilized. A controller controls a traveling state and is switchable between a first or normal mode and a second or vehicle speed suppression mode. The second or vehicle speed suppression mode can be switched back to the first or normal mode when the coupled state is detected and a predetermined releasing operation is performed.

18 Claims, 7 Drawing Sheets

WORK VEHICLE WITH SPEED CONTROL SYSTEM

CROSS-REFERENCE TO RELATED APPLICATIONS

The present application claims priority under 35 U.S.C. § 119 of Japanese Application No. 2016-117194, filed on Jun. 13, 2016, the disclosure of which is expressly incorporated by reference herein in its entirety.

BACKGROUND OF THE INVENTION

1. Field of the Invention

The present invention relates to a work vehicle having a speed control system that utilizes a pair of left/right brake operation tools or devices that can brake each of left and right wheels.

2. Description of Related Art

Conventionally, a tractor (exemplary work vehicle) is provided with a controller, which controls a traveling state of a vehicle body so as to reach a speed change state commanded by a speed change operator such as a human-operated commander (a primary speed change lever, an auxiliary speed change lever); a coupling member which is switchable between a coupled state where a pair of left/right brake operation tools are integrally coupled and a released state releasing the coupling; and a coupled state detector which detects whether the coupling member is in the coupled state or the released state. The controller controls the traveling state of the vehicle body so as to reach the speed change state commanded by the speed change operator without limiting a vehicle speed when the coupled state detector detects the coupled state; however, when the coupled state detector detects the released state, the vehicle speed is limited at or less than a predetermined vehicle speed (for example, see Japanese Patent Laid-open Publication No. 2012-244961).

The conventional configuration noted above secures traveling safety such that not only one of the left/right brake operation tools is operated when the work vehicle is traveling at high speed during road travel.

In the conventional configuration noted above, the controller is in a state where the vehicle speed is controlled at or less than the predetermined vehicle speed when the coupled state detector detects the released state, and the controller is in the state where the vehicle speed is not controlled when the coupled state detector detects the coupled state. In this configuration, for example, when traveling in the state where the coupled state detector detects the released state and the vehicle speed is limited, even when high speed is commanded by a human-operated commander such as an accelerator operation tool, the vehicle speed does not exceed the predetermined vehicle speed.

However, in the conventional configuration noted above, for example, in the state where the high speed is commanded as a targeted vehicle speed by the human-operated commander, when a brake coupler is switched to the coupled state from the released state, a limitation on the vehicle speed is immediately released and the vehicle speed is accelerated rapidly to reach the targeted vehicle speed at the high speed commanded by the commander, and therefore, the configuration is not preferable in view of traveling safety. Accordingly, an improvement to traveling safety has been desired to avoid such a disadvantage.

SUMMARY OF THE INVENTION

A work vehicle according to the present invention is configured with a pair of left/right brake operation tools which brake each of left and right wheels provided to a vehicle body, a coupling member which is switchable between a coupled state where the pair of left/right brake operation tools are integrally coupled and a released state releasing the coupling, a coupled state detector which detects whether the coupling member is in the coupled state or the released state, a human-operated commander commanding a targeted traveling state of the vehicle body, and a traveling controller controlling the traveling state of the vehicle body based on the command from the commander. The traveling controller is switchable between a normal mode which controls the traveling state of the vehicle body so as to reach the targeted traveling state commanded by the commander, and a vehicle speed suppression mode which controls the traveling state of the vehicle body so as to be in a traveling state at a lower speed than the vehicle speed corresponding to the targeted traveling state commanded by the commander, and when the coupled state detector detects the released state while the normal mode is set, the traveling controller switches to the vehicle speed suppression mode, and when the coupled state detector detects the coupled state and a predetermined releasing operation is performed with the commander while the vehicle speed suppression mode is set, the traveling controller switches to the normal mode, and maintains the vehicle speed suppression mode when the predetermined releasing operation is not performed.

According to the present invention, the traveling controller controls, when the normal mode is set, the traveling state of the vehicle body so as to reach the targeted traveling state commanded by the commander. When the coupled state detector detects the released state while the normal mode is set, the traveling controller is switched to the vehicle speed suppression mode. In the vehicle speed suppression mode, the traveling state of the vehicle body is controlled so as to reach the traveling state at the lower speed than the vehicle speed corresponding to the targeted traveling state commanded by the commander.

The traveling controller is switched to the normal mode while the vehicle speed suppression mode is set when the coupled state detector detects the coupled state and the predetermined releasing operation is performed by the commander. In other words, as a requirement to switch from the vehicle speed suppression mode to the normal mode, in addition to a requirement that the coupled state detector detect the coupled state, the predetermined releasing operation needs to be performed by the commander.

As a result, even when the coupling member is switched from the released state to the coupled state and the coupled state detector detects the switch, the traveling controller is not immediately switched to the normal mode; instead, the predetermined releasing operation needs to be performed by the commander, and therefore, unless the predetermined releasing operation is performed, the traveling controller maintains the vehicle speed suppression mode. The predetermined releasing operation is an operation to confirm whether a driver intends to release the vehicle speed suppression mode or not. Examples of the predetermined releasing operation include a return operation of an accelerator operation tool to a position at or below a predetermined low speed operation position, releasing a constant speed traveling state when the constant speed traveling state is commanded, and the like.

Therefore, according to the present invention, it becomes possible to improve traveling safety by avoiding a disadvantage such that the vehicle speed rapidly increases immediately after the coupling member switches from the released state to the coupled state.

In the present invention, the work vehicle includes the accelerator operation tool for which the commander commands, as the targeted traveling state, a speed regulating position of the engine mounted to the vehicle body, and preferably, the traveling controller is switched to the normal mode when the accelerator operation tool is return-operated to a position at or below a predetermined low speed operation position as the predetermined releasing operation while the vehicle speed suppression mode is set.

According to the present configuration, even in a state where a high speed is commanded by the accelerator operation tool while the vehicle speed suppression mode is set, the traveling controller is switched to the normal mode when a requirement that the coupled state detector detects the coupled state and a requirement that the accelerator operation tool be return-operated to the position at or below the predetermined low speed operation position are both satisfied.

When the vehicle body is traveling, the vehicle speed is adjusted according to the operation of the accelerator operation tool, however, when the vehicle speed suppression mode is set, the vehicle speed does not exceed the predetermined vehicle speed even when the accelerator operation tool is operated toward high speed. In a state where the accelerator operation tool is operated toward high speed in this way, when the coupled state detector detects the coupled state, the traveling controller is switched to the normal mode when the accelerator operation tool is return-operated to the position at or below the predetermined low speed operation position.

When the accelerator operation tool is operated to the position at or below the predetermined low speed operation position, the vehicle body is in a state traveling at a low speed at or below the predetermined vehicle speed, or is in a state in which travel is stopped. As a result, when switched to the normal mode, rapid acceleration can be reliably avoided.

In the present invention, the work vehicle includes a speed change operation tool for which the commander commands, as the targeted traveling state, a speed change ratio of a speed change device mounted to the vehicle body, and preferably, the traveling controller is switched to the normal mode while the vehicle speed suppression mode is set when the speed change operation tool is return-operated to the position at or below the predetermined low speed operation position as the predetermined releasing operation.

According to the present configuration, even in a state where a high speed is commanded by the speed change operation tool while the vehicle speed suppression mode is set, the traveling controller is switched to the normal mode when the requirement that the coupled state detector detect the coupled state and the requirement that the speed change operation tool be return-operated to the position at or below the predetermined low speed operation position are both satisfied.

When the vehicle body is traveling, the vehicle speed is adjusted according to the operation of the speed change operation tool, however, when the vehicle speed suppression mode is set, the vehicle speed does not exceed the predetermined vehicle speed even when the speed change operation tool is operated toward high speed. In a state where the speed change operation tool is operated toward high speed in this way, when the coupled state detector detects the coupled state, the traveling controller is switched to the normal mode when the speed change operation tool is return-operated to the position at or below the predetermined low speed operation position.

When the speed change operation tool is operated to the position at or below the predetermined low speed operation position, the vehicle body is in the state traveling at a low speed at or below the predetermined vehicle speed, or is in the state in which travel is stopped. As a result, when switched to the normal mode, rapid acceleration can be reliably avoided.

In the present invention, preferably, the predetermined low speed operation position is an idling position.

According to the present configuration, the accelerator operation tool or the speed change operation tool being return-operated to the idling position is a requirement for the traveling controller to be switched to the normal mode. As a result, the accelerator operation tool or the speed change operation tool is returned to the operation position for placing the vehicle body in a state in which travel is stopped, and therefore, the driver's intention to release the vehicle speed suppression mode is obvious and the traveling controller can be switched from the vehicle speed suppression mode to the normal mode with appropriate timing.

In the present invention, the coupled state detector is configured by a switch, and preferably, the switch is in an on state when the coupling member is in the coupled state where the pair of left/right brake operation tools are integrally coupled.

According to the present configuration, when the switch configuring the coupled state detector is the on state, the traveling controller is determined to be in the coupled state. As a result, for example, even when a disconnection failure happens during working travel while the switch detects an off state and the traveling controller is set to the vehicle speed suppression mode, the switch maintains the off state and the traveling controller is determined to be in a non-coupled state, and therefore, the traveling controller can avoid switching from the vehicle speed suppression mode to the normal mode based on an erroneous judgement.

In the present invention, the work vehicle includes a cruise operation tool which is switchable between an on state in which the commander commands, as the targeted traveling state, a constant speed traveling state traveling at a constant, defined vehicle speed, and an off state in which the constant speed traveling state is released; and preferably, while switched to the vehicle speed suppression mode, the traveling controller is switched to the normal mode when the cruise operation tool is operated to the off state as the predetermined releasing operation.

According to the present configuration, when the cruise operation tool is switched to the on state, the traveling controller performs control so as to travel at a constant speed at the defined vehicle speed. While switched to the vehicle speed suppression mode, when the coupled state detector detects the coupled state and the cruise operation tool is operated to the off state, the traveling controller is switched to the normal mode. When switched to the normal mode, the limitation on the vehicle speed is released and the vehicle can travel at high speed by allowing the vehicle speed to exceed the defined vehicle speed.

When the cruise operation tool is operated to the off state by an operation of the driver, the driver's intention to release the vehicle speed suppression mode is obvious and the traveling controller can be switched from the vehicle speed suppression mode to the normal mode with appropriate timing.

The invention also relates to work vehicle having a speed control system, comprising a left brake operation device configured to brake a left wheel and a right brake operation device configured to brake a right wheel. A coupling member is movable between a coupled state that connects together the left and right brake operation devices and a released state allowing the left and right brake operation devices to move independent of one another. A detector detects whether the coupling member is in the coupled state or the released state. A vehicle accelerator device is utilized. A controller communicates with the vehicle accelerator device and configured to implement each of a normal travel mode and a vehicle speed suppression mode. Wen in the normal mode, the controller controls the travel speed of the work vehicle consistent with the vehicle accelerator device. When in the vehicle speed suppression mode, the controller controls the travel speed of the work vehicle in a manner that is not consistent with the vehicle accelerator device. During vehicle travel in the normal mode, the normal mode is switched by the controller to the vehicle speed suppression mode when either the released state is detected by the detector or the coupled state is not detected by the detector. During vehicle travel in the vehicle speed suppression mode, the vehicle speed suppression mode is switched by the controller to the normal mode when (or only when) the coupled state is detected by the detector and a releasing movement is performed by the vehicle accelerator device.

During vehicle travel in the vehicle speed suppression mode, the vehicle speed suppression mode can be maintained until the releasing movement is performed.

The releasing movement may be performed when the vehicle accelerator device moves to an initial position.

The releasing movement may be performed when the vehicle accelerator device moves to or below a predetermined low speed operation position.

The releasing movement may be performed when the vehicle accelerator device moves to a position that corresponds to an engine idling position or a position that does not cause the work vehicle to move from a static position.

The vehicle accelerator device may regulate engine speed.

The vehicle accelerator device may control a speed change ratio of a speed change device mounted to a vehicle body of the work vehicle.

The detector may be a sensor.

The detector may be a switch having an ON position during the coupled state.

The work vehicle may be configured to utilize a cruise operation device.

The vehicle accelerator device may be arranged in a cabin area of the work vehicle.

The vehicle accelerator device may be an accelerator pedal.

The left and right brake operation devices may be arranged in a cabin of the work vehicle.

The left and right brake operation devices may be brake pedals.

The left and right brake operation devices may be brake pedals arranged on one side of a work vehicle steering device, wherein the vehicle accelerator device is an accelerator pedal arranged on the one side of the work vehicle steering device, and further comprising a clutch pedal arranged on an opposite side of the work vehicle steering device.

The work vehicle steering device may be a steering wheel.

The invention also provides for a work vehicle having an engine, a transmission and a speed control system, comprising a left brake operation device configured to brake a left wheel and a right brake operation device configured to brake a right wheel. A coupling member is movable between a coupled state that connects together the left and right brake operation devices and a released state allowing the left and right brake operation devices to move independent of one another. A sensor or switch detects whether the coupling member is in the coupled state or the released state. A user operated vehicle speed change device is configured to change a travel speed of the work vehicle. A controller receives input from the user operated vehicle speed change device and configured to implement each of a normal travel mode and a vehicle speed suppression mode. When the work vehicle is in the normal mode, the controller controls the travel speed of the work vehicle consistent with commands of the user operated vehicle speed change device. When the work vehicle is in the vehicle speed suppression mode, the controller controls the travel speed of the work vehicle in a manner that is consistent with commands of the user operated vehicle speed change device between a first predetermined low travel speed range and non-consistent with or contrary to commands of the user operated vehicle speed change device at or upon reaching a predetermined travel speed. During vehicle travel in the normal mode, the normal mode is switched by the controller to the vehicle speed suppression mode when the released state is detected. During vehicle travel in the vehicle speed suppression mode, the vehicle speed suppression mode is switched by the controller to the normal mode when the coupled state is detected and a releasing movement is performed by the user operated speed change device.

The releasing movement may be performed one of when the user operated speed change device moves to an initial position, when the user operated speed change device moves to or below a predetermined low speed operation position, or when the user operated speed change device moves to a position that corresponds to an engine idling position.

The invention is also directed to a work vehicle having an engine, a transmission and a speed control system, comprising a left brake operation device configured to brake a left wheel and a right brake operation device configured to brake a right wheel. A coupling member is movable between a coupled state that connects together the left and right brake operation devices and a released state allowing the left and right brake operation devices to move independent of one another. A sensor or switch detects whether the coupling member is in the coupled state or the released state. A user operated vehicle speed change device is configured to change a travel speed of the work vehicle. A controller receives input from the user operated vehicle speed change device and configured to implement each of a normal travel mode and a vehicle speed suppression mode. When the work vehicle is in the normal mode, the controller controls the travel speed of the work vehicle consistent with commands of the user operated vehicle speed change device. When the work vehicle is in the vehicle speed suppression mode, the controller controls the travel speed of the work vehicle in a manner that is consistent with commands of the user operated vehicle speed change device between a first predetermined low travel speed range and contrary to commands of the user operated vehicle speed change device when the vehicle travel speed reaches a predetermined maximum allowable travel speed, whereby the vehicle travel speed is prevented from increasing by the controller beyond the predetermined maximum allowable travel speed. During vehicle travel in the normal mode, the normal mode is switched by the controller to the vehicle speed suppression mode when the released state is detected. During vehicle travel in the vehicle speed suppression mode, the vehicle speed suppression mode is switched by the controller to the normal mode when the coupled state is detected and a releasing movement is performed by the user operated speed change device.

The releasing movement may be performed one of when the user operated speed change device moves to an initial position, when the user operated speed change device moves to or below a predetermined low speed operation position, or when the user operated speed change device moves to a position that corresponds to an engine idling position.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, a case where an embodiment of a work vehicle according to the present invention is applied to a tractor is described with reference to the drawings.

Figure 1:
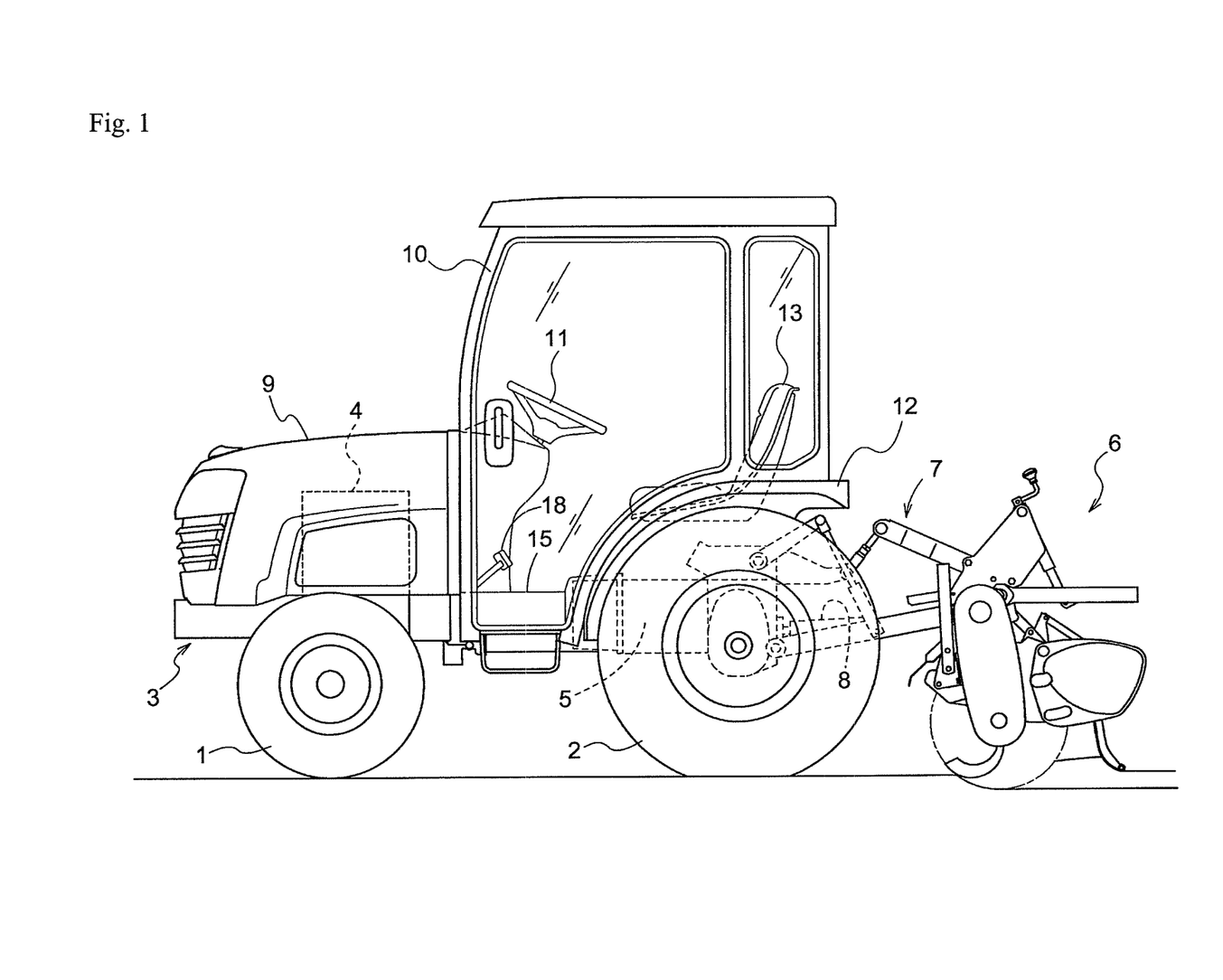
FIG. 1 is an overall side view of an exemplary tractor.

FIG. 1 illustrates an exemplary tractor according to the present invention. The tractor has a vehicle body 3 supported by front wheels 1 and rear wheels 2. An engine 4 is mounted in a front portion of the vehicle body 3 and a transmission 5 is mounted rearward of the engine 4. Rearward of the vehicle body 3, there is disposed a rotary tilling apparatus 6 so as to be vertically movable via a link mechanism 7. The tractor is a four-wheel-drive vehicle in which drive power of the engine 4 is transmitted to the front wheels 1 and the rear wheels 2 via a transmission mechanism built into the transmission 5. Moreover, drive power from the engine 4 is transmitted to the rotary tilling apparatus 6 via a PTO shaft 8, which projects rearward from the transmission 5. The engine 4 is covered by a hood 9. A cabin 10 is supported by the vehicle body 3 and is located rearward of the hood 9 and above the transmission 5.

Figure 2:
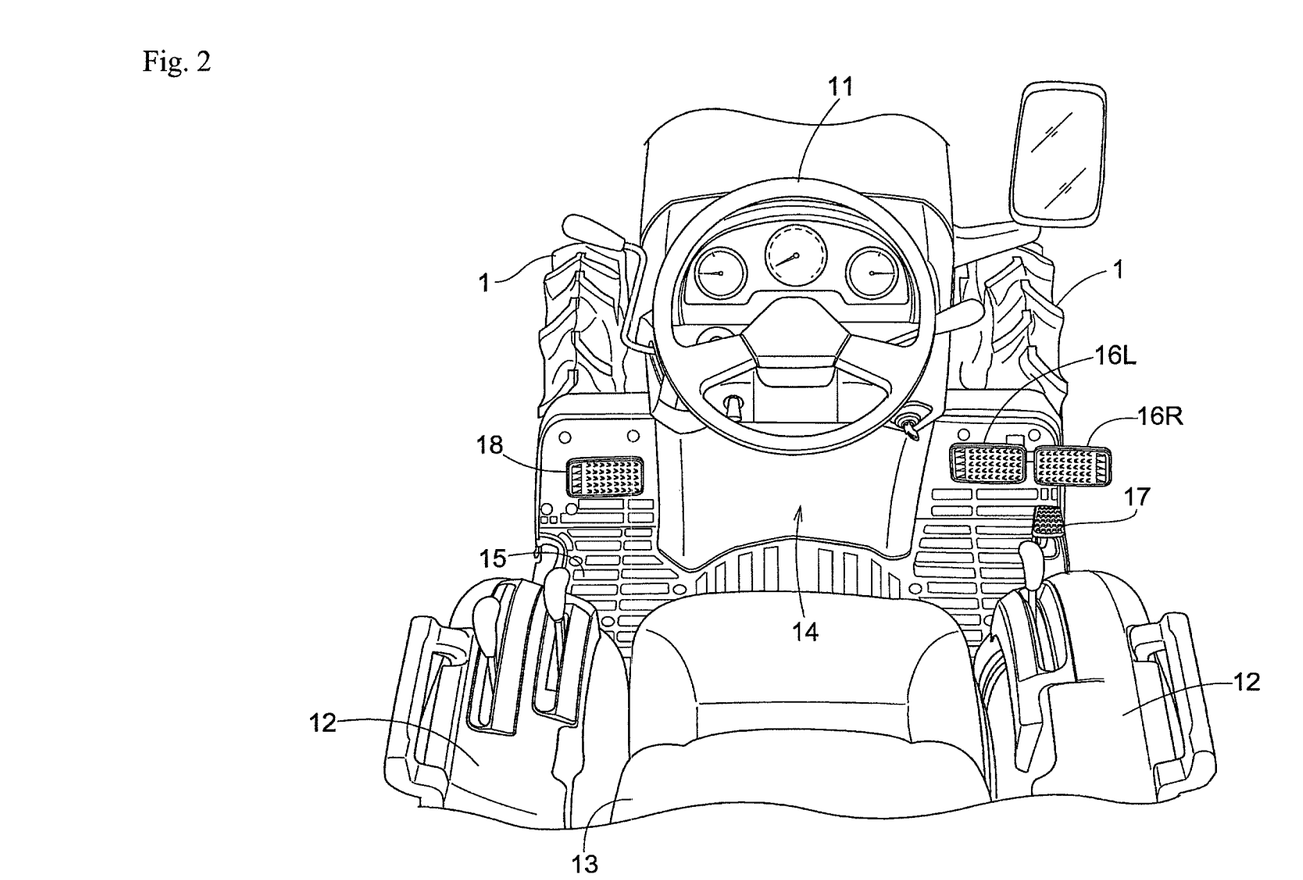
FIG. 2 is a plan view of a driving space thereof.

As shown in FIG. 2, an interior of the cabin 10 serves as a driving space (the cabin is omitted in FIG. 2). At a front portion of the driving space, a steering handle or wheel 11 is located and is used to steer the front wheels 1. A driver seat 13 is positioned between a left/right pair of rear wheel fenders 12. Located on a driving space floor 15, on a right side of a handle post 14, there is provided a pair of brake pedals 16R and 16L and an accelerator pedal 17. A main clutch pedal 18 is arranged on the driving space floor 15 and on a left side of the handle post 14.

The pair of brake pedals 16R and 16L, the accelerator pedal 17, and the main clutch pedal 18 are each movable vertically within a predetermined operation range by foot depression and are return-biased toward an upper side non-operation position by a spring (not shown). By pressing the foot down against the return-biasing force of the spring, operation positions of the pedals can be changed.

Figure 3:
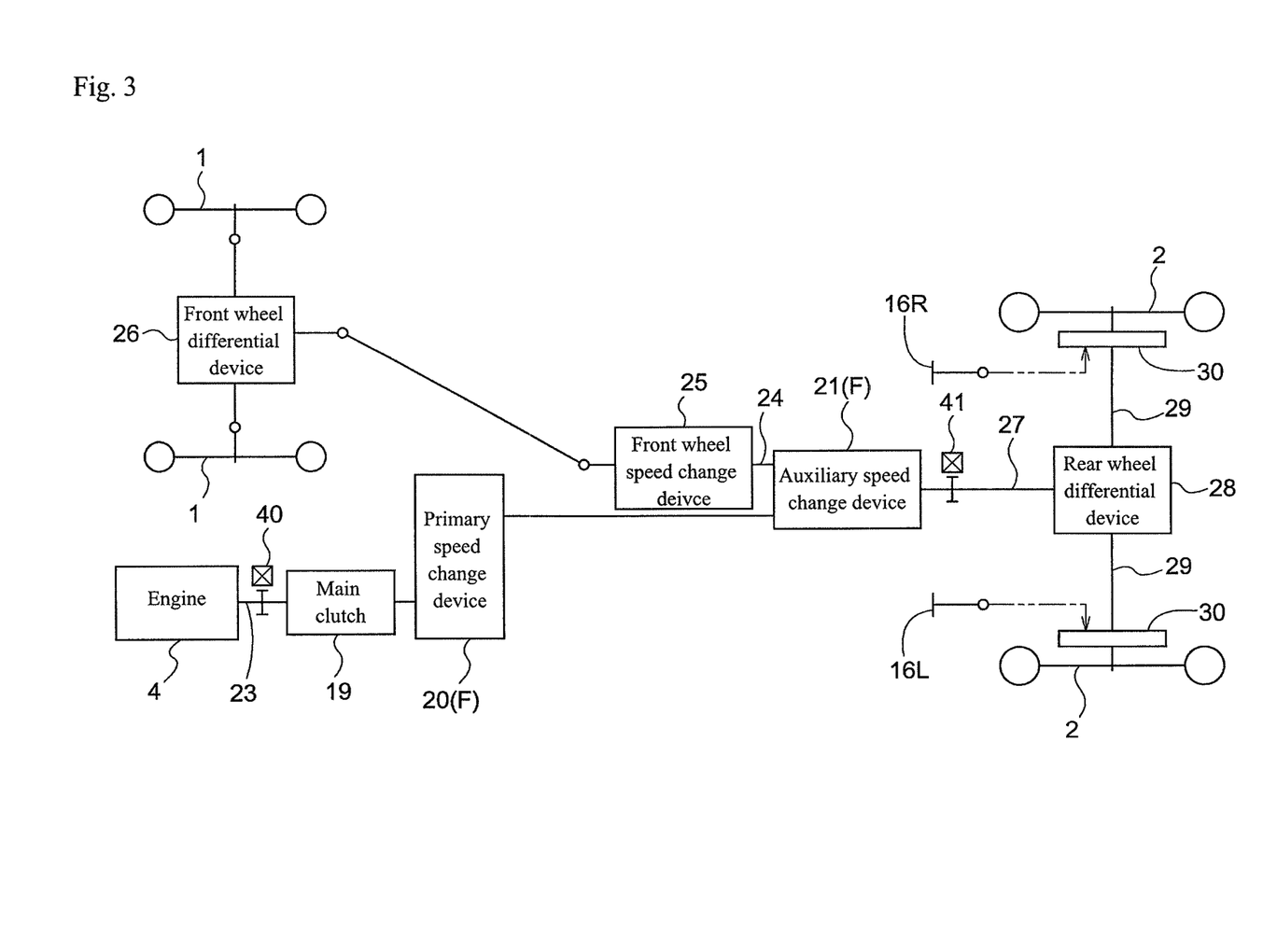
FIG. 3 is a transmission system diagram.

As shown in FIG. 3, a speed change device F which changes a speed of drive power from the engine 4 transmitted via a main clutch 19 is provided with a primary speed change device 20 which can switch between a plurality of speed change stages without interrupting transmission of the drive power. A gear-type auxiliary speed change device 21 can switch between the plurality of speed change stages accompanied by an interruption of the transmission of drive power.

The primary speed change device 20 can be configured with, for example, a well-known hydraulic static transmission (HST) which is formed by a swash plate-type variable discharge hydraulic pump receiving drive power from an output shaft 23 of the engine 4 and via a hydraulic motor rotating due to hydraulic pressure of the hydraulic pump and outputting the drive power. A well-known hydraulic mechanical transmission (HMT) can be used which combines the HST with a planetary gear mechanism; or the like The drive power (after the speed change obtained from a front wheel output shaft 24 of the auxiliary speed change device 21) is transmitted to the left/right front wheels 1 via front wheel speed change device 25. A front wheel differential device 26 (and the like) is used as the drive power for front wheel driving. The drive power (after the speed change obtained from a rear wheel output shaft 27 of the auxiliary speed change device 21) is transmitted to the left/right rear wheels 2 via a rear wheel differential device 28, a left/right rear wheel axle 29, and the like. Accordingly, the tractor is configured to have four-wheel-drive driving the left/right front wheels 1 and rear wheels 2.

Although not described in detail, the primary speed change device 20 and the auxiliary speed change device 21 are each provided with an actuator to operate the speed change of a hydraulic cylinder, an electric cylinder, and the like. By controlling the operation of the actuator, the speed change operation is performed.

Figure 8:
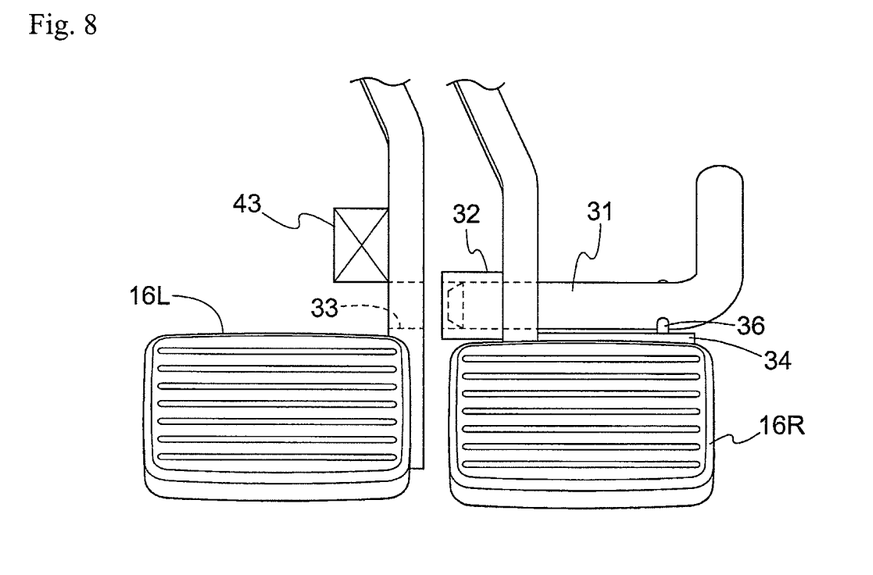
FIG. 8 is a plan view of an exemplary brake operation tool.
Figure 9:
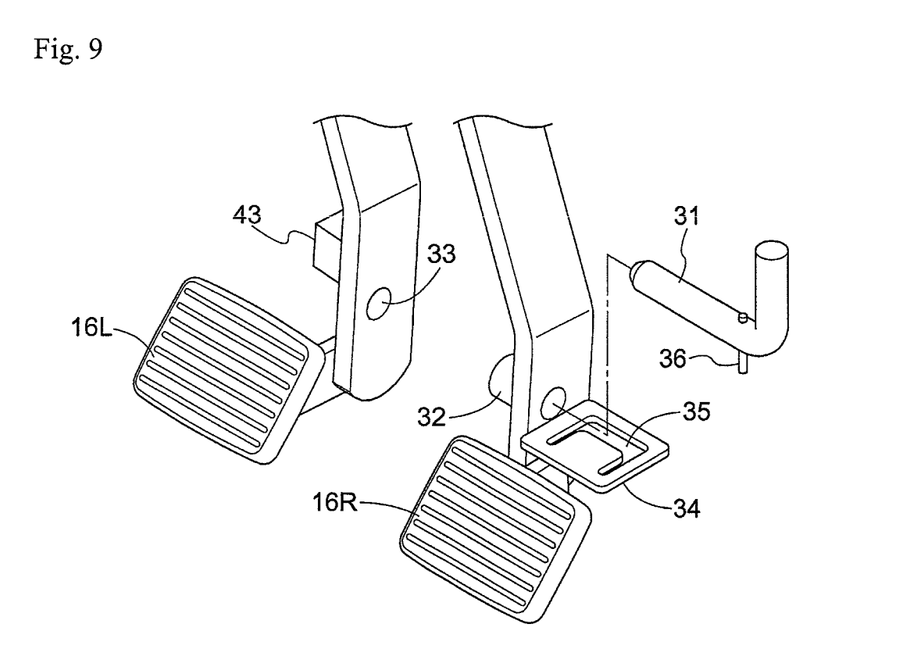
FIG. 9 is an exploded perspective view of the brake operation tool.

The pair of left/right brake pedals 16R and 16L (on the driving space floor 15) are coupled to left/right brake devices 30 arranged on the rear wheel axles 29 and enable individual brake operation. In addition, the pair of left/right brake pedals 16R and 16L are supported by the vehicle body so as to be swingably operable to allow individual foot depression operation. As shown in FIGS. 8 and 9, a coupling member 31 is utilized and is switchable between a coupled state where the pair of left/right brake pedals 16R and 16L are integrally coupled and a released state (FIG. 8) releasing the coupling.

The coupling member 31 can be formed by bending a rod in substantially an "L" shape, and is slidably supported in left/right directions in a state where the coupling member 31 is internally fitted to a boss 32 provided to the right brake pedal 16R. By sliding the coupling member 31 in the left direction and inserting the coupling member 31 through an insertion hole 33 which is formed on the left brake pedal 16L, the left/right brake pedals 16R and 16L enter the coupled state where individual operation of each pedal 16L and 16R is stopped or prevented. When in the released state, however, the left/right brake pedals 16R and 16L are allowed to move independent of one another or can otherwise move individually.

As shown in FIG. 9, an engagement pin 36 is fixed to the coupling member 31, and this engagement pin 36 is guided by and engages with a guide groove 35 (having substantially a "U" shape) formed in a guide plate 34 which is fixed to the right brake pedal 16R. After coupling the left/right brake pedals 16R and 16L via the coupling member 31, the engagement pin 36 can be displaced to a left front edge of the guide groove 35 by the coupling. By displacing the engagement pin 36 to a left rear edge of the guide groove 35, the left/right brake pedals 16R and 16L can maintain the coupled state. After the coupling of the left/right brake pedals 16R and 16L with the coupling member 31 is released, the engagement pin 36 can be displaced to a right front edge of the guide groove 35 based on the coupling release. By displacing the engagement pin 36 to a right rear edge of the guide groove 35, the left/right brake pedals 16R and 16L can maintain the coupling released state.

During road travel, by switching the coupling member 31 to the coupled state and by maintaining the state where the left/right brake pedals 16R and 16L are integrally coupled, a single brake condition can be used in which one of the left/right brake pedals 16R and 16L being depressed by the operator's foot can be prevented from happening when the vehicle is brake-decelerated or brake-stopped. In addition, during working travel in, e.g., a field, one can switch the coupling member 31 to the released state and by maintaining a state where individual depression of the left/right brake pedals 16R and 16L by the operator's foot is possible, a small turn can be made in which the rear wheel 2 on a turn-interior side is braked by operating only the brake pedal (one of the left and right brake pedals 16R and 16L) on the turn-interior side.

Figure 4:
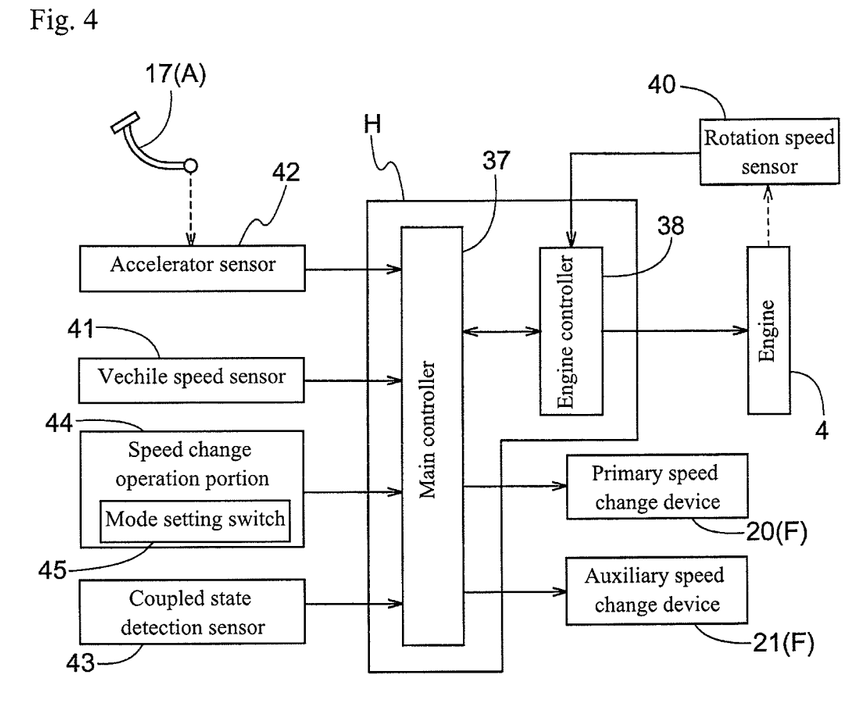
FIG. 4 is a control block diagram.

As shown in FIG. 4, a main controller 37 and an engine controller 38 can be utilized. The main controller 37 can define a targeted rotation speed of the engine 4 in accordance with the operation position of the accelerator pedal 17 and can control a speed change state of the primary speed change device 20 and the auxiliary speed change device 21. The engine controller 38 controls the operation of the engine 4 based on setting information defined by the main controller 37. A traveling controller H controlling a traveling state of the vehicle can be configured by the combination of the main controller 37 and the engine controller 38.

As shown in FIGS. 3 and 4, a rotation speed sensor 40, a vehicle speed sensor 41, an accelerator sensor 42, and a coupled state detection sensor 43 are utilized. The rotation speed sensor 40 detects engine rotation speed by detecting the rotation speed of the output shaft 23 of the engine 4. The vehicle speed sensor 41 detects vehicle speed of the vehicle body 3 by detecting the rotation speed of the rear wheel output shaft 27 of the auxiliary speed change device 21. The accelerator sensor 42 (which can be a potentiometer-type sensor) detects the operation position of the accelerator pedal 17. The coupled state detection sensor 43 serves as a coupled state detector which detects whether the coupling member 31 is in the coupled state or the released state.

The coupled state detection sensor 43 can be configured as a switch such as a limit switch, for example. The coupled state detection sensor 43 can also be configured such that the switch is ON (conductive state) when the coupling member 31 is in the coupled state; and the switch is OFF (interrupted state) when the coupling member 31 is in the released state (or not in the coupled state). With this configuration, for example, when the coupling member 31 is in the released state and the coupled state detection sensor 43 is in the switch OFF state, the switch maintains the off state even when a midway portion of wiring is disconnected during working travel. As a result, the traveling controller H can determine that the coupling member 31 is in the coupled state, and therefore the traveling controller H can avoid switching from a vehicle speed suppression mode to a normal mode based on an erroneous judgement.

In the vicinity of the driver seat 13, a speed change operation portion 44 can be arranged to serve as a speed change tool commanding the speed change state of the primary speed change device 20 and the auxiliary speed change device 21 (see FIG. 4). In the speed change operation portion 44 (not shown in detail) can have the form of a plurality of operation switches of various types such as push button, slide, dial, lever, and the like. In the speed change operation portion 44, a mode setting switch 45 can be provided to command, as a control mode, either a working travel mode used for working in the field or a road travel mode used for the road travel.

As shown in FIG. 4, the respective detection information from the accelerator sensor 42, the vehicle speed sensor 41, the speed change operation portion 44, and the coupled state detection sensor 43 are input to the main controller 37. The main controller 37 finds or determines the targeted rotation speed based on the detection information of the accelerator sensor 42, and the engine controller 38 is configured such that, when the command of the targeted rotation speed defined by the main controller 37 is received, the engine controller 38 controls the rotation speed of the engine 4 by controlling, e.g., a fuel injection amount or injection timing based on the detection information of the rotation speed sensor 40.

The main controller 37 is configured to allow switching between, as travel modes, the normal mode which controls the traveling state of the vehicle body so as to achieve a targeted traveling state commanded by the accelerator pedal 17, and the vehicle speed suppression mode which controls the traveling state of the vehicle body so as to achieve a traveling state having a lower speed than the vehicle speed corresponding to the targeted traveling state commanded by the accelerator pedal 17.

Figure 5:
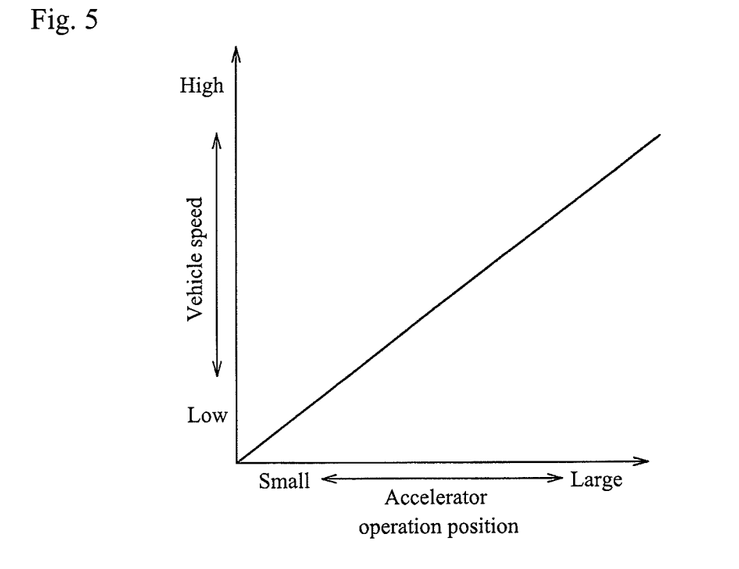
FIG. 5 illustrates a relationship between an accelerator operation position and vehicle speed in a normal mode.
Figure 6:
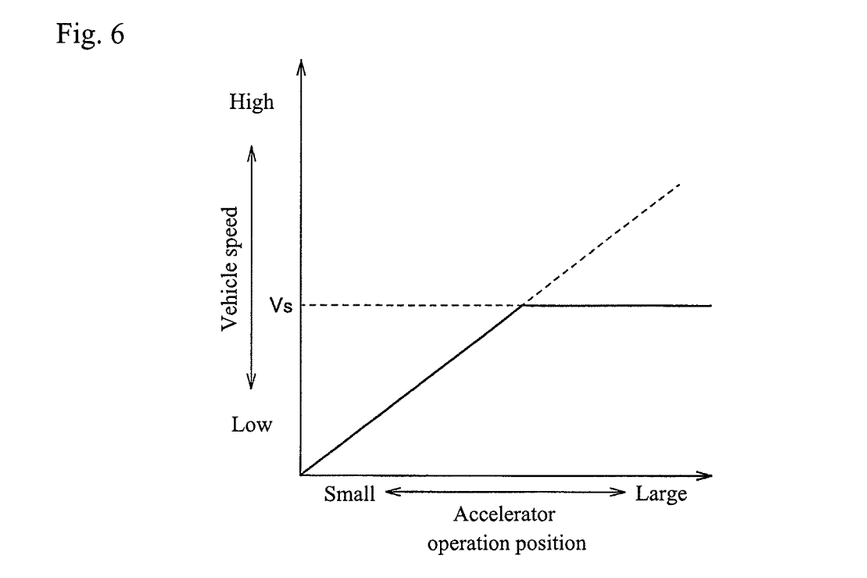
FIG. 6 illustrates a relationship between the accelerator operation position and the vehicle speed in a speed suppression mode.

In the main controller 37, a relationship between the operation position of the accelerator pedal 17 and the targeted rotation speed can be defined ahead of time by, e.g., a map, table data, or the like. As shown in FIG. 5, in the normal mode, the targeted rotation speed of the engine 4 is found based on the operation position of the accelerator pedal 17 over an entire range of the operating area of the accelerator pedal 17 using, e.g., the map or graph. As shown in FIG. 6, in the vehicle speed suppression mode, the targeted rotation speed of the engine 4 is found based on the operation position of the accelerator pedal 17 on or within a low speed side or range of the operating area of the accelerator pedal 17. However, in the high speed operating area where the targeted vehicle speed exceeds a set or predetermined vehicle speed Vs, even when the operation position of the accelerator pedal 17 is changed, the targeted vehicle speed is always maintained at the set vehicle speed Vs. In other words, when the travel speed reaches Vs, while in the vehicle speed suppression mode, the speed change commends of the accelerator pedal 17 are ignored or not complied with—which would otherwise cause an increase in travel speed.

While the main controller 37 is set to the normal mode, the main controller 37 can switch to the vehicle speed suppression mode when the coupled state detection sensor 43 detects the released state. While the main controller 37 is set to the vehicle speed suppression mode, the main controller 37 switches to the normal mode when the coupled state detection sensor 43 detects the coupled state and a predetermined releasing operation is performed with the accelerator pedal 17, but otherwise maintains the vehicle speed suppression mode if the predetermined releasing operation is not performed.

Figure 7:
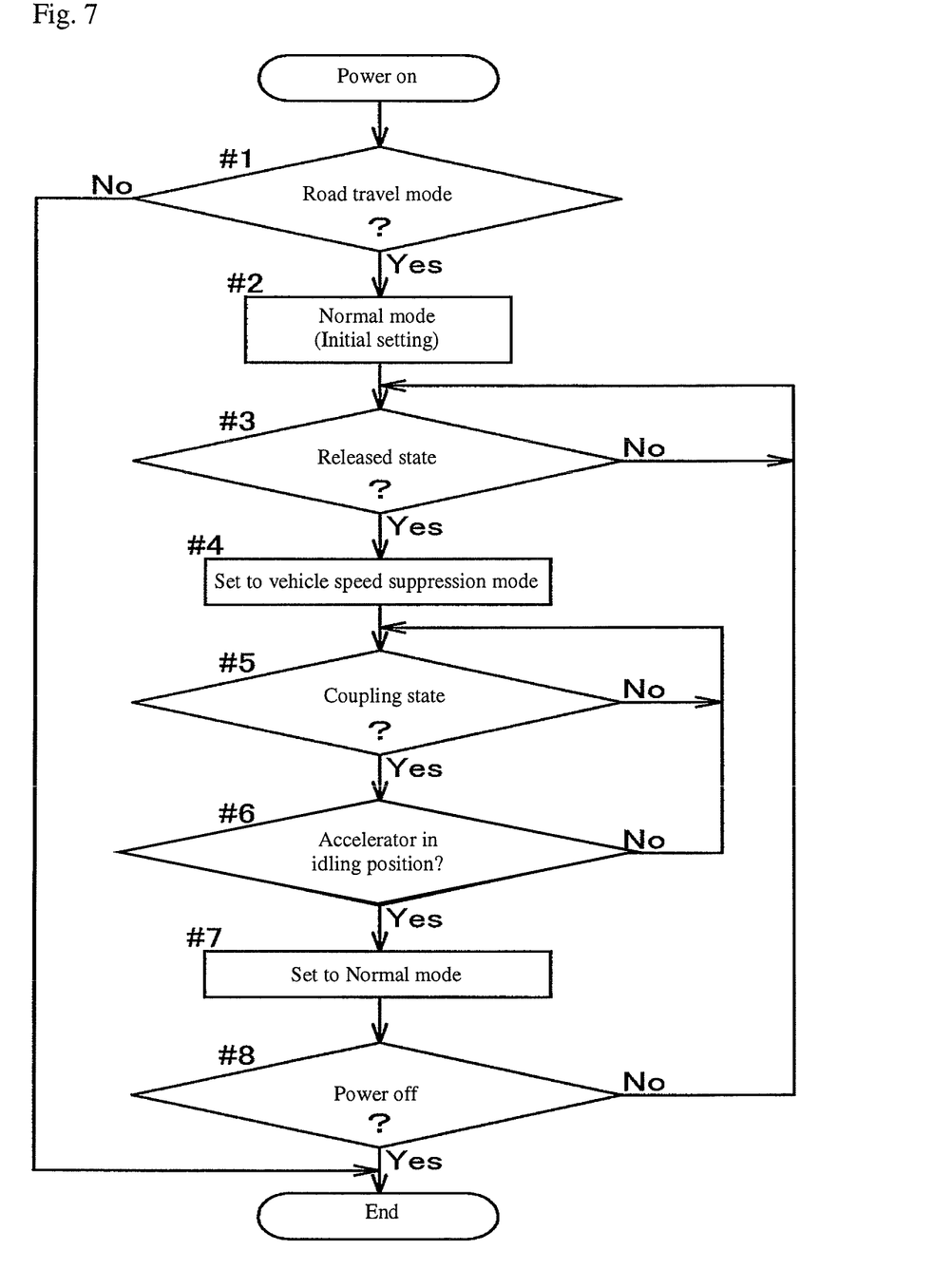
FIG. 7 is a control flow chart.

Hereafter, a switching process of the travel mode of the main controller 37 is described in detail. As shown in FIG. 7, when the power is turned on and the road travel mode is set by the mode setting switch 45, the switching process of the travel mode is performed as described below (Step 1).

First, the normal mode is set as the travel mode (Step 2). When the normal mode is set, the targeted rotation speed of the engine 4 is found using the targeted vehicle speed corresponding to the operation position of the accelerator pedal 17 over the entire range of the operating area of the accelerator pedal 17 using the map or graph illustrated in FIG. 5. Then, the operation of the engine 4 is controlled by the engine controller 38 such that the rotation speed of the engine 4 reaches the targeted rotation speed. In the road travel mode, the primary speed change device 20 and the auxiliary speed change device 21 are set to the speed change stages for road travel and the vehicle speed is modified and adjusted by changing the rotation speed of the engine 4 by foot depression of the accelerator pedal 17.

Under the normal mode, the coupling member 31 is moved, transitioning from the state where the left/right pair of brake pedals 16R and 16L are coupled to the state where the coupling is released, and when the released state is detected by the coupled state detection sensor 43, the main controller 37 switches from the normal mode to the vehicle speed suppression mode and sets the vehicle speed suppression mode as the travel mode (Steps 3 and 4). When the vehicle speed suppression mode is set, as shown in FIG. 6, even when the operation position of the accelerator pedal 17 is changed, the targeted vehicle speed is always maintained at the set vehicle speed Vs in the high speed operating area. As a result, in the high speed operating area, no matter where the accelerator pedal 17 is operated, the targeted vehicle speed is maintained at the set vehicle speed Vs or less than Vs. Therefore, the targeted rotation speed of the engine 4 is also maintained at a certain value which is found from the set vehicle speed Vs, with the operation of the engine 4 being controlled by the engine controller 38 such that the rotation speed of the engine 4 reaches the targeted rotation speed.

While the vehicle speed suppression mode is set, the coupled state can be detected by the coupled state detection sensor 43, and thereafter, once it is detected based on the detection information of the accelerator sensor 42 that the foot depression of the accelerator pedal 17 is released and the accelerator pedal 17 is returned to an idling position (exemplary predetermined low speed operation position) by the return-biasing force (Steps 5 and 6), the vehicle speed suppression mode can be switched to the normal mode and the normal mode is set as the travel mode (Step 7). Thereafter, Steps 3 to 7 are performed repeatedly until the power is turned off (Step 8).

In other words, in the state where the vehicle speed suppression mode is set, even when the coupled state is detected by the coupled state detection sensor 43, the process does not switch to the normal mode immediately, and instead maintains the vehicle speed suppression mode unless and until the predetermined releasing operation is performed with the accelerator pedal 17. Therefore, in this embodiment, the accelerator pedal 17 functions as a human-operated commander A commanding the targeted traveling state of the vehicle body. Releasing the foot depression of pedal 17 and allowing the returning of the same to the idling position by the return-biasing force corresponds to a predetermined releasing operation.

Other Embodiments (1) In the embodiment above, the accelerator pedal 17 is provided as a human-operated commander A. However, instead of the accelerator pedal 17, a hand-operated accelerator lever may be provided instead of or in combination with the accelerator pedal 17. In the configuration combining the accelerator pedal 17 and a accelerator lever, each of the accelerator pedal 17 and the accelerator lever can be configured to return to the idling position (the predetermined low speed operation position) as the predetermined releasing operation. In addition, the predetermined low speed operation position may be an operation position corresponding to the value setting the low speed side defined ahead of time, and is not limited to the idling position.

(2) In the embodiment above, in a state where the speed change device F (the primary speed change device 20 and auxiliary speed change device 21) is set at the predetermined speed change state, the vehicle speed can be changed and adjusted by stepping on the accelerator pedal 17. However, the following configuration may be used instead.

A hand-operated accelerator lever can be used that is configured so as to be capable of holding at a desired operation position. Examples include a configuration in which the accelerator lever is held at a predetermined operation position on the high speed side and the vehicle speed is changed and adjusted by operating the speed change operation portion 44. When the vehicle speed suppression mode is defined, the main controller 37 may be configured to switch to the normal mode when the coupling state detection sensor 43 detects the coupled state and the speed change operation portion 44 (commander) is operated to the operation position corresponding to a state in which the vehicle speed is in the low speed state with equal to or less than a predetermined value or a state in which travel is stopped (the predetermined releasing operation).

(3) In addition to returning the accelerator pedal 17 and the accelerator lever to the idling position, and operating the speed change operation portion 44 to the state in which the vehicle speed is in the low speed state with equal to or less than the predetermined value or the state in which travel is stopped, the following configuration may be applied as the predetermined releasing operation.

Apart from the normal driving mode where the main controller 37 changes the vehicle speed by the speed change operation portion 44 or the accelerator pedal 17, the main controller 37 may be configured so as to be capable of setting a constant speed traveling state which automatically adjusts the output of the engine 4 and the speed change state of the speed change device F so as to maintain the vehicle speed at a constant speed even without operating the speed change operation portion 44 or the accelerator pedal 17. The main controller 37 may also be configured with a cruise operation tool or system (not shown) to allow switching between, as the targeted traveling states, the on state commanding the constant speed traveling state traveling at the defined vehicle speed, and the off state defining the normal driving mode by releasing the constant speed traveling state.

Further, in this configuration, when the cruise control is in the on state and the constant speed traveling state is set, and when the vehicle body is traveling in the state where the main controller 37 is switched to the vehicle speed suppression mode, even though the coupled state detection sensor 43 detects the coupled state, the main controller 37 does not switch to the normal mode immediately. When the requirement that the coupled state detection sensor 43 detect the coupled state and the requirement that the cruise operation tool be operated to the off state as the predetermined releasing operation are both satisfied, the main controller 37 may switch to the normal mode.

(4) In the embodiment above, the traveling controller H can be configured so as to set the speed change device F to the speed change stage for road travel and to change and adjust the vehicle speed by changing the rotation speed of the engine 4. In addition, the traveling controller H can be configured such that in the vehicle speed suppression mode, even when the accelerator pedal 17 is operated in the high speed operating area, the vehicle speed is suppressed by maintaining the targeted rotation speed of the engine 4 at a value equivalent to the set vehicle speed Vs. However, instead of this configuration, the following configurations (4-1) and (4-2) may be used. In short, any other configuration may be allowed as long as the configuration exerts control so as to achieve a traveling state at a lower speed than the vehicle speed corresponding to the traveling state targeted by the commander or accelerator.

(4-1) As for the engine 4, by using a map or graph comparable to that illustrated in FIG. 5, the targeted rotation speed of the engine 4 can be found from the targeted vehicle speed corresponding to the operation position of the accelerator pedal 17 over the entire range of the operating area of the accelerator pedal 17, and the engine is controlled based on the information. In the vehicle speed suppression mode, a configuration may be used to switch the speed change stage of the speed change device F toward a deceleration side such that the vehicle speed detected by the vehicle speed sensor 41 is maintained at the set vehicle speed Vs.

(4-2) The control of the engine 4 is configured to perform the same control mentioned above in (4-1), and apart from the human-operated brake device 30, an electronically controlled brake device is provided which is capable of changing and adjusting braking force using an actuator. In the vehicle speed suppression mode, a configuration may be used which controls the operation of the electronically controlled brake device such that the actual vehicle speed detected by the vehicle speed sensor 41 is maintained at the set vehicle speed Vs.

(5) In the embodiment above, a description is given of the present invention applied to a tractor as an example of a work vehicle, however, the present invention is not limited to a tractor and can be applied to various work vehicles such as a delivery vehicle having a loading platform, for example.

The present invention can be applied to any work vehicle provided with a pair of left/right brake operation tools which brake each of left and right wheels such as, e.g., left and right rear wheels.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle having a speed control system, comprising:
a left brake pedal configured to brake a left wheel;
a right brake pedal configured to brake a right wheel;
a coupling member movable between a coupled state that connects together the left and right brake pedals and a released state allowing the left and right brake pedals to move independent of one another;
a sensor detecting whether the coupling member is in the coupled state or the released state;
a vehicle accelerator pedal or lever configured to change a travel speed of the work vehicle; and
a controller communicating with the vehicle accelerator pedal or lever and configured to implement each of a first mode and a second mode,
wherein, when in the first mode, the controller controls the travel speed of the work vehicle consistent with the vehicle accelerator pedal or lever,
wherein, when in the second mode, the controller controls the travel speed of the work vehicle in a manner that is not consistent with the vehicle accelerator pedal or lever,
wherein, during the vehicle traveling in the first mode, the first mode is switched by the controller to the second mode when either:
the released state is detected by the sensor; or
the coupled state is not detected by the sensor; and
wherein, during the vehicle traveling in the second mode, the second mode is switched by the controller to the first mode when:
the coupled state is detected by the sensor; and
a releasing movement is performed by the vehicle accelerator pedal or lever.

2. The work vehicle of claim 1, wherein, during the vehicle traveling in the second mode, the second mode is maintained until the releasing movement is performed.

3. The work vehicle of claim 1, wherein the releasing movement is performed when the vehicle accelerator pedal or lever moves to an initial position.

4. The work vehicle of claim 1, wherein the releasing movement is performed when the vehicle accelerator pedal or lever moves to or below a predetermined low speed operation position.

5. The work vehicle of claim 1, wherein the releasing movement is performed when the vehicle accelerator pedal or lever moves to a position that corresponds to an engine idling position or a position that does not cause the work vehicle to move from a static position.

6. The work vehicle of claim 1, wherein the vehicle accelerator pedal or lever regulates engine speed.

7. The work vehicle of claim 1, wherein the vehicle accelerator pedal or lever controls a speed change ratio of a speed change device mounted to a vehicle body of the work vehicle.

8. The work vehicle of claim 1, wherein the sensor is a switch having an ON position during the coupled state.

9. The work vehicle of claim 1, wherein the work vehicle is configured to utilize a cruise operation device.

10. The work vehicle of claim 1, wherein the vehicle accelerator pedal or lever is arranged in a cabin area of the work vehicle.

11. The work vehicle of claim 1, wherein the left and right brake pedals are arranged in a cabin of the work vehicle.

12. The work vehicle of claim 1, wherein the first mode is a normal mode and the second mode is a vehicle speed suppression mode.

13. The work vehicle of claim 1, wherein the left and right brake pedals are arranged on a left or right side of a work vehicle steering device, wherein the vehicle accelerator pedal is arranged on the left or right side of the work vehicle steering device, and further comprising a clutch pedal arranged on a side of the work vehicle steering device opposite that side on which the brake pedals are arranged.

14. The work vehicle of claim 13, wherein the work vehicle steering device is a steering wheel.

15. A work vehicle having an engine, a transmission and a speed control system, comprising:
   a left brake pedal configured to brake a left wheel;
   a right brake pedal configured to brake a right wheel;
   a coupling member movable between a coupled state that connects together the left and right brake pedals and a released state allowing the left and right brake pedals to move independent of one another;
   a sensor or switch that detects whether the coupling member is in the coupled state or the released state;
   a user operated pedal or lever configured to change a travel speed of the work vehicle; and
   a controller receiving input from the user operated pedal or lever and configured to implement each of a first travel mode and a second travel mode,
   wherein, when the work vehicle is in the first travel mode, the controller controls the travel speed of the work vehicle consistent with the input of the user operated vehicle speed change device,
   wherein, when the work vehicle is in the second travel mode, the controller controls the travel speed of the work vehicle in a manner that is:
   consistent with the input of the user operated pedal or lever within a first predetermined low travel speed range; and
   non-consistent with or contrary to the input of the user operated pedal or lever at or upon reaching a predetermined travel speed,
   wherein, during the vehicle traveling in the first travel mode, the first travel mode is switched by the controller to the second travel mode when the released state is detected, and
   wherein, during the vehicle traveling in the second travel mode, the second travel mode is switched by the controller to the first travel mode when:
   the coupled state is detected; and
   a releasing movement is performed by the user operated speed change pedal or lever.

16. The work vehicle of claim 15, wherein the releasing movement is performed one of:
   when the user operated pedal or lever moves to an initial position;
   when the user operated pedal or lever moves to or below a predetermined low speed operation position; or
   when the user operated pedal or lever moves to a position that corresponds to an engine idling position.

17. A work vehicle having an engine, a transmission and a speed control system, comprising:
   a left brake configured to brake a left wheel;
   a right brake configured to brake a right wheel;
   a coupling member movable between a coupled state that connects together the left and right brakes and a released state allowing the left and right brakes to move independent of one another;
   a sensor or switch that detects whether the coupling member is in the coupled state or the released state;
   a user operated vehicle speed change pedal or lever configured to change a travel speed of the work vehicle; and
   a controller receiving input from the user operated vehicle speed change pedal or lever and configured to implement each of a first travel mode and a second travel mode,
   wherein, when the work vehicle is in the first travel mode, the controller controls the travel speed of the work vehicle consistent with the input of the user operated vehicle speed change pedal or lever,
   wherein, when the work vehicle is in the second vehicle travel mode, the controller controls the travel speed of the work vehicle in a manner that is:
   consistent with the input of the user operated vehicle speed change pedal or lever within a first predetermined low travel speed range; and
   contrary to the input of the user operated vehicle speed change pedal or lever when the vehicle travel speed reaches a predetermined maximum allowable travel speed, whereby the vehicle travel speed is prevented from increasing by the controller beyond the predetermined maximum allowable travel speed,
   wherein, during the vehicle traveling in the first travel mode, the first travel mode is switched by the controller to the second travel mode when the released state is detected, and
   wherein, during the vehicle traveling in the second travel mode, the second travel mode is switched by the controller to the first travel mode only when:
   the coupled state is detected; and
   a releasing movement is performed by the user operated vehicle speed change pedal or lever.

18. The work vehicle of claim 17, wherein the releasing movement is performed when the user operated pedal or lever moves one of:
   to an initial position;

to or below a predetermined low speed operation position that is lower than the predetermined maximum allowable travel speed; or to a position that corresponds to an engine idling position.

* * * * *

UNITED STATES PATENT AND TRADEMARK OFFICE
CERTIFICATE OF CORRECTION

PATENT NO. : 10,569,783 B2
APPLICATION NO. : 15/618829
DATED : February 25, 2020
INVENTOR(S) : Y. Kuroshita et al.

Page 1 of 1

It is certified that error appears in the above-identified patent and that said Letters Patent is hereby corrected as shown below:

In the Claims

Column 16, Line 10, Claim 15, Line 28, please delete "speed change"
Column 16, Line 63, Claim 17, Line 43, please delete "vehicle"

Signed and Sealed this
Sixth Day of October, 2020

Andrei Iancu
*Director of the United States Patent and Trademark Office*